United States Patent
Hoffmann

(10) Patent No.: US 10,021,643 B2
(45) Date of Patent: Jul. 10, 2018

(54) USER PLANE IDLE MODE BUFFERING WITHIN SOFTWARE DEFINED NETWORK ARCHITECTURE

(71) Applicant: NOKIA SOLUTIONS AND NETWORKS GMBH & CO. KG, Munich (DE)

(72) Inventor: Klaus Hoffmann, Munich (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 70 days.

(21) Appl. No.: 14/901,784

(22) PCT Filed: Jul. 3, 2013

(86) PCT No.: PCT/EP2013/064055
§ 371 (c)(1),
(2) Date: Dec. 29, 2015

(87) PCT Pub. No.: WO2015/000516
PCT Pub. Date: Jan. 8, 2015

(65) Prior Publication Data
US 2016/0142977 A1    May 19, 2016

(51) Int. Cl.
*H04W 52/02* (2009.01)
*H04L 12/863* (2013.01)

(52) U.S. Cl.
CPC ......... *H04W 52/0225* (2013.01); *H04L 47/62* (2013.01); *H04W 52/0216* (2013.01);
(Continued)

(58) Field of Classification Search
CPC ......... H04W 52/0216; H04W 52/0219; H04W 52/0225; H04L 47/62; Y02D 70/00; Y02D 70/1262; Y02D 70/1224; Y02D 70/1264
See application file for complete search history.

(56) References Cited

U.S. PATENT DOCUMENTS

| 2011/0103310 A1* | 5/2011 | Stojanovski | H04L 12/66 370/328 |
| 2011/0310804 A1* | 12/2011 | Beygzadeh | H04W 68/00 370/328 |

(Continued)

FOREIGN PATENT DOCUMENTS

WO    WO 2011/162667 A1    12/2011

OTHER PUBLICATIONS

International Search Report & Written Opinion dated May 8, 2014 corresponding to International Patent Application No. PCT/EP2013/064055.

(Continued)

*Primary Examiner* — Peter Chen
(74) *Attorney, Agent, or Firm* — Squire Patton Boggs (US) LLP

(57) ABSTRACT

The present invention addresses a method, apparatus and computer program product for enabling PMM/ECM IDLE buffering within software defined network architecture. Thereby, it is indicated that a user plane idle state is active, a buffer for a user plane idle procedure is allocated in a user plane node, and a communications protocol controller is notified about received packets at the user plane node, wherein only the first received packet is to be indicated to the communications protocol controller while any subsequent received packet is appended to the allocated buffer.

15 Claims, 3 Drawing Sheets

(52) U.S. Cl.
CPC ......... *H04W 52/0219* (2013.01); *Y02D 70/00* (2018.01); *Y02D 70/1224* (2018.01); *Y02D 70/1262* (2018.01); *Y02D 70/1264* (2018.01)

(56) References Cited

U.S. PATENT DOCUMENTS

2012/0093086 A1* 4/2012 Yin .................... H04L 69/16 370/328
2012/0275401 A1* 11/2012 Sun .................... H04W 72/04 370/329

OTHER PUBLICATIONS

3GPP TS 23.401 V11.4.0 (Dec. 2012), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 11), Dec. 18, 2012, XP050691115, 284 pages.

3GPP TS 23.401 V11.6.0 (Jun. 2013), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 11), Jun. 2013, 286 pages.

3GPP TS 23.122 V11.4.0 (Dec. 2012), Technical Specification, 3rd Generation Partnership Project; Technical Specification Group Core Network and Terminals; Non-Access-Stratum (NAS) functions related to Mobile Station (MS) in idle mode (Release 11), Dec. 2012, 45 pages.

3GPP TS 36.304 V11.3.0 (Mar. 2013), Technical Specification, 3rd Generation Partnership Project; Technical Specification Group Radio Access Network; Evolved Universal Terrestrial Radio Access (E-UTRA); User Equipment (UE) procedures in idle mode (Release 11), Mar. 2013, 34 pages.

ITU-T H.248.1 Telecommunication Standardization Sector of ITU (Mar. 2013); Series H: Audiovisual and Multimedia Systems Infrastructure of audiovisual services—Communication procedures; Gateway control Protocol: Version 3, Mar. 2013, 242 pages.

* cited by examiner

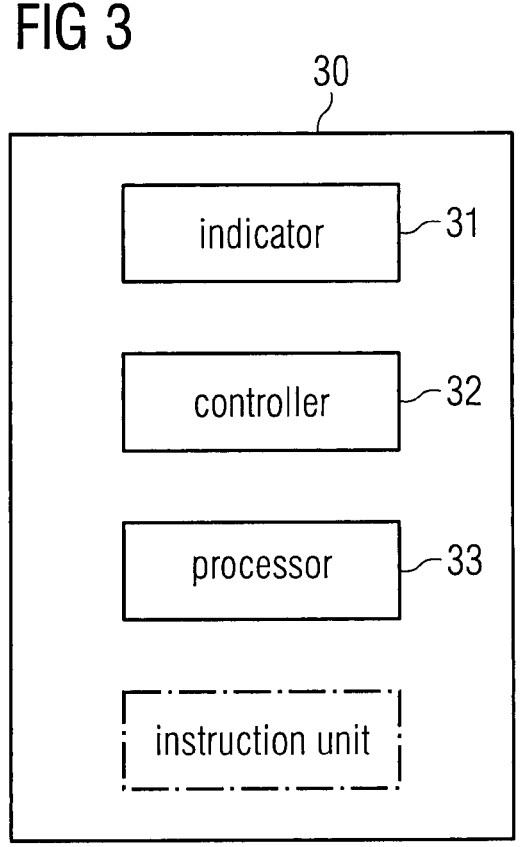

USER PLANE IDLE MODE BUFFERING WITHIN SOFTWARE DEFINED NETWORK ARCHITECTURE

FIELD OF THE INVENTION

The present invention generally relates to wireless communication networks, and more specifically relates to a method, apparatus and computer program product for enabling user plane IDLE mode buffering within software defined network SDN architecture.

BACKGROUND

Mobile data transmission and data services are constantly making progress, wherein such services provide various communication services, such as voice, video, packet data, messaging, broadcast, etc. In recent years, Long Term Evolution LTE™ has been specified, which uses the Evolved Universal Terrestrial Radio Access Network E-UTRAN as radio communication architecture according to 3GPP specification.

Furthermore, network virtualization is used in recent technologies, which splits the conventional networks into subsets to be used, operated and managed by different organizationally independent organizations. The use of network virtualization offers flexibility in the development of future network architectures.

The technical field according to the present invention is a software defined network SDN for use e.g. in mobile telecommunication networks. Within the research of software defined networks SDN, a separation of the control plane and the user plane is discussed.

In the control plane, a communication protocol is used, such as OpenFlow, FOrCES (Forwarding and Control Element Separation protocol), etc, for controlling the respective entities. However, in current SDN environments, the serving gateway SGW and/or Serving General Packet Radio Service Support Node SGSN controller cannot signal towards the SGW and/or SGSN user plane that an IDLE procedure, such as a Packet Mobility Management PMM-IDLE and/or an Evolved Packet System Connection Management ECM-IDLE procedure is to be applied.

For improving energy consumption of communication devices and for optimizing data traffic, current wireless communication networks, such as the E-UTRAN network, employ an idle state for network devices. In particular, a user equipment UE is in a so called ECM (Evolved Packet System Connection Management)-IDLE state and/or a PMM (Packet Mobility Management)-IDLE state, when no non-access stratum NAS signaling connection between the UE and the network exists. In the ECM-IDLE state according to E-UTRAN networks, a UE performs cell selection/reselection according [1] and public land mobile network PLMN selection according to [2].

PRIOR ART DOCUMENTS

[1] 3GPP TS 36.304
[2] 3GPP TS 23.122
[3] 3GPP TS 23.401

As already indicated above, there exists no UE context in E-UTRAN for the UE in the ECM-IDLE state. That is, there is no S1 mobile management entity MME connection and no S1_user plane connection for the UE in the ECM-IDLE state. According to 3GPP environments, the SGW may perform buffering (cf. "mobility management" in [3]), however, the SGW user plane cannot signal that it supports ISR (idle mode signaling reduction) towards the SGW controller.

SUMMARY OF THE INVENTION

Therefore, in order to overcome the drawbacks of the prior art, it is an object underlying the present invention to enable ECM IDLE buffering within software defined network SDN architecture.

In particular, it is an object of the present invention to provide a method, apparatus and computer program product for enabling ECM IDLE buffering within software defined network SDN architecture.

According to a first aspect of the present invention, there is provided a method, comprising indicating that a user plane idle state is active, allocating, in a user plane node, a buffer for an user plane idle procedure, and notifying a communications protocol controller about received packets at the at least one of the Serving Gateway user plane and the Serving General Packet Radio Service Support Node user plane, wherein only the first received packet is to be indicated to the communications protocol controller while any subsequent received packet is appended to the allocated buffer.

According to a second aspect of the present invention, there is provided an apparatus comprising an indicator configured to indicate that a user plane idle state is active, a controller configured to allocate, in a user plane node, a buffer for a user plane idle procedure, and a processor configured to notify a communications protocol controller about received packets at the user plane node, wherein only the first received packet is to be indicated to the communications protocol controller while any subsequent received packet is appended to the allocated buffer.

According to a third aspect of the present invention, there is provided a computer program product comprising computer-executable components which, when the program is run, are configured to carry out the method according to the first aspect.

Advantageous further developments or modifications of the aforementioned exemplary aspects of the present invention are set out in the dependent claims.

According to certain embodiments of the present invention, the idle state is a Evolved Packet System Connection Management idle state, wherein the buffer is allocated for an Evolved Packet System Connection Management idle procedure, and/or, the idle state is a Packet Mobility Management idle state, wherein the buffer is allocated for a Packet Mobility Management idle process.

According to certain embodiments of the present invention, the user plane node is at least one of a Serving Gateway user plane and a Serving General Packet Radio Service Support Node user plane.

According to certain embodiments of the present invention, an instruction unit may be configured to cause detaching a General Packet Radio Service tunnel protocol tunnel between a base station and the user plane node from a General Packet Radio Service tunnel protocol tunnel between the serving gateway user plane and a packet gateway user plane, while keeping the General Packet Radio Service tunnel protocol tunnel between the serving gateway user plane and the packet gateway user plane.

According to certain embodiments of the present invention, the processor is adapted to request the serving gateway to send all received (e.g. downlink and/or uplink) packets after successful establishment of bearers between the base station and the serving gateway and/or the Serving General Packet Radio Service Support Node.

According to certain embodiments of the present invention, the indication that the user plane idle state is active, the instruction for allocating the buffer, and the notification about received downlink packets are included in a message which is composed by the communications protocol controller and is transmitted to the user plane node.

Further, according to certain embodiments of the present invention, the communications protocol is an interface between the control and forwarding layers of a software defined network architecture.

Further, according to certain embodiments of the present invention, the communications protocol is a protocol in an Open Flow or Forces (IETF) or H.248 (ITU-T) environment.

Further, according to certain embodiments of the present invention, in case of an Evolved Packet System Connection Management idle state, the indication that an Evolved Packet System Connection Management idle state is active is an ECM IDLE information element, and, in case of a Packet Mobility Management idle state, the indication that a Packet Mobility Management idle state is active is an PMM IDLE information element. Preferably, the ECM IDLE and/or PMM IDLE active Information Element may be included in a Modification Flow or an additional separate message in an Open Flow protocol environment.

Further, according to certain embodiments of the present invention, the communications protocol controller is integrated with the serving gateway control plane or the Serving General Packet Radio Service Support Node control plane or physically and/or logically separated from the serving gateway control plane or the Serving General Packet Radio Service Support Node control plane.

Still further, the present invention may be implemented as an apparatus comprising at least one processor and at least one memory including computer program code, wherein the at least one memory and the computer program code configured to, with the at least one processor, cause the apparatus at least to perform indicating that a user plane idle state is active, allocating, in a user plane node, a buffer for a user plane idle procedure, and notifying a communications protocol controller about received packets at the user plane node, wherein only the first received packet is to be indicated to the communications protocol controller while any subsequent received packet is appended to the allocated buffer.

BRIEF DESCRIPTION OF DRAWINGS

For a more complete understanding of example embodiments of the present invention, reference is now made to the following descriptions taken in connection with the accompanying drawings in which:

FIG. 3 schematically illustrates an apparatus according to certain embodiments of the invention.

DESCRIPTION OF EXEMPLARY EMBODIMENTS

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

As already indicated above, the present invention generally relates to software defined network SDN for use e.g. in mobile telecommunication networks, wherein user plane IDLE buffering is enabled.

Figure 1:
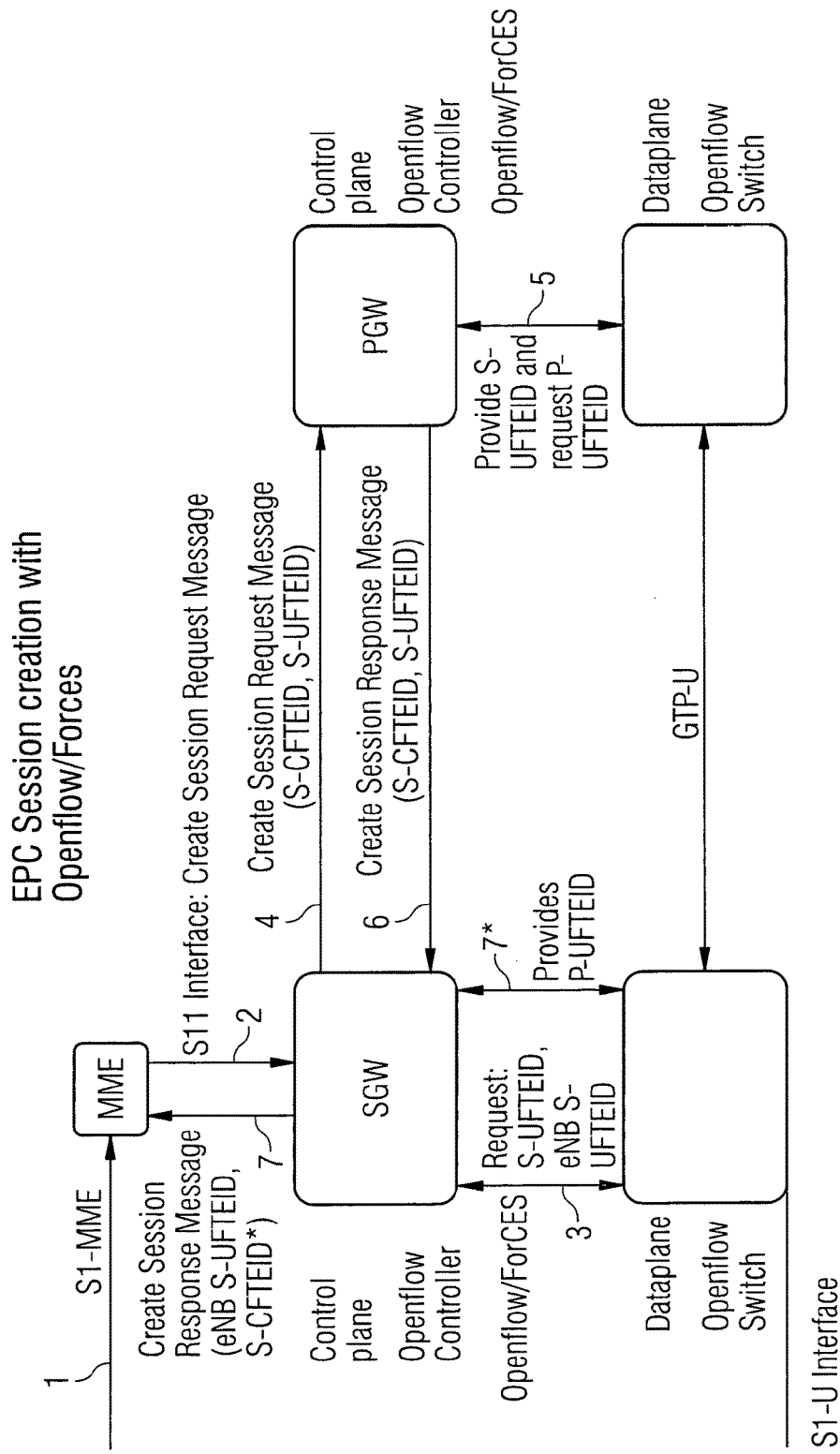
FIG. 1 schematically shows a SGW/PGW separation of control and user plane via OpenFlow/FOrCES.

FIG. 1 schematically shows a SGW/PGW separation of control and user plane via OpenFlow as technological background. In particular, a EPC Session creation with OpenFlow/FOrCES is illustrated. As is shown in FIG. 1, the SGW-C having e.g. an OpenFlow controller requests from the SGW-U to notify and to buffer packets, which might be received via the GTP-U from the PGW.

According to certain embodiments of the present invention, in order to activate the ECM IDLE procedure, a protocol, such as OpenFlow or any similar protocol (e.g. FOrCES, etc), carries at least an additional new information element IE, such as "ECM-IDLE active", for minimizing resource occupation on the eNB, mobile management entity MME and SGW, so that the forwarding equipment at the serving gateway user plane SGW-U detaches the GPRS tunnel protocol GTP tunnel towards the eNB, but the tunnel from the SGW towards the PGW is still kept.

Due to this, the SGW-U in accordance with this invention allocates an additional buffer for the ECM-IDLE procedure. In this state, the SGW-U may receive packets from the remote side from the PGW, which are to be buffered in the allocated buffer for later usage.

Figure 2:
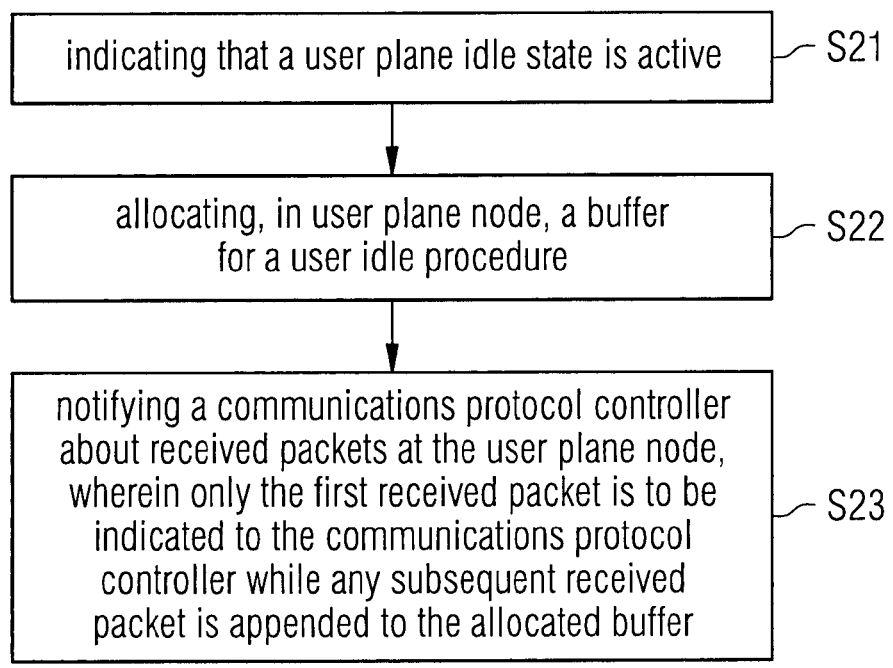
FIG. 2 illustrates a method according to certain embodiments of the invention.

FIG. 2 shows a principle flowchart of an example for a method according to certain embodiments of the present invention.

In Step S21, it is indicated that a user plane idle state is active.

In Step S22, a buffer for a user plane idle procedure is allocated in a user plane node.

In Step S23, a communications protocol controller is notified about received packets at the user plane node, wherein only the first received packet is to be indicated to the communications protocol controller while any subsequent received packet is appended to the allocated buffer.

FIG. 3 shows a principle configuration of an example for an apparatus according to certain embodiments of the present invention.

The apparatus 30 comprises an indicator 31 configured to indicate that a user plane idle state is active, a controller 32 configured to allocate, in a user plane node, a buffer for a user plane idle procedure, and a processor 33 configured to notify a communications protocol controller about received packets at the user plane node, wherein only the first received packet is to be indicated to the communications protocol controller while any subsequent received packet is appended to the allocated buffer.

According to certain embodiments of the present invention, the SGW/SGSN control plane application requests with the "ECM-IDLE active" and/or "PMM-IDLE active" a new trigger point from the forwarding SGW/SGSN-U, indicating that packets arrived.

Thereby, the SGW controller application may inform the mobile management entity MME, e.g. via the "ECM-IDLE mode downlink packet buffering and initiation of network triggered service request procedure" according to 3GPP based on the Downlink Data Notification requests, about the presence of arrived packets, via an information which indicates e.g. "packets buffered", preferably instead of sending some or all of the received packets to the controller, such that the existing bearer or a newly to be created bearer between the UE and the SGW is established with an existing 3GPP procedure.

According to certain embodiments of the present invention, upon the receipt of this trigger indicating that packets arrived at the SGW control application, the bearer is established between a user equipment UE and a serving gateway SGW by paging and the "UE triggered Service Request procedure". The (re-) attachment of the bearer between the eNB (base station) and the SGW with the bearer (the still existing GTP Tunnel) from the SGW towards the PGW during the "UE triggered Service Request procedure" is to be requested with an OpenFlow (or similar) interface.

On receipt and after successful completion, the SGW-C/OpenFlow Controller may request the SGW-U to send the buffered packets towards the UE.

According to certain embodiments of the present invention, the Controller (based on OpenFlow protocol, but not limited to OpenFlow), which may be integrated with the SGW-C or not, may use the "Modification Flow message" to detach the GTP Tunnel between the enB and SGW-U from the GTP Tunnel between SGW-U and PGW-U, which is kept.

Simultaneously the "Modification Flow message" is augmented with the indication "ECM-IDLE active", so that the SGW-U is expected to notify the (OpenFlow) Controller, which may be integrated with the SGW-C or not, about the downlink packets received from the far end.

But instead of sending every individual packet, which would also be stored in an individual buffer individually at the SGW-U, to the controller, it is requested with this new indication that only the very first packet is indicated to the (OpenFlow) controller, such that the paging and service request procedure is triggered, while any subsequent packet is appended to an (aggregated) buffer in the SGW-U.

As such, both the OpenFlow controller and the OpenFlow Switch (here an OpenFlow Switch with the SGW-U functionality capable to handle GTP Tunnels) are relieved from additional and unnecessary computational and signaling load.

After the successful establishment of the bearers between enB and SGW, the OpenFlow) Controller requests the SGW-U to send all downlink data. Since during the establishment of the bearer multiple packets had been buffered, and instead of sending multiple "single packet out" messages to the SGW-U for/with different buffers of each individual packet, the (OpenFlow) controller sends one packet out message for the aggregated/appended buffer to the SGW-U.

Furthermore, according to certain embodiments of the present invention, the new capability of aggregating multiple packets into preferably one "appending" or "aggregating" buffer is able to be negotiated during handshake via the Features Request message between the (OpenFlow) Controller and the (OpenFlow) switch.

The procedure according to the present invention may also be applied to a "HeNB subsystem", which consists of a home basestation HeNB, optionally a HeNB gateway GW, and optionally a Local GW.

Similar to the SGSN and the SGW, also a L-GW (Local Gateway) locally connected to a HeNB (Home eNB) may be a user plane node, which is expected to support the ECM-IDLE mode downlink packet buffering.

Furthermore, according to certain embodiments of the present invention, the same procedure may also be applied to the serving GPRS support node SGSN or the gateway GPRS support node GGSN, once the SDN approach is not only implemented in the SGW.

Even if some of the above-mentioned embodiments are described by using the OpenFlow protocol, it is to be noted that instead of OpenFlow any other protocol, as for instance Forces, SNMP or NetConf, may be used.

Further, it is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The present invention relates in particular but without limitation to mobile communications, for example to environments under LTE™ or LTE-Advanced, and can advantageously be implemented also in controllers, base stations, user equipments or smart phones, or computers connectable to such networks. That is, it can be implemented e.g. as/in chipsets to connected devices.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following meanings for the abbreviations used in this specification apply:
3GPP 3rd Generation Partnership Project
ECM Evolved Packet System Connection Management
eNB evolved Node B (base station in LTE)
EPC evolved Packet Core
E-UTRAN Evolved Universal Terrestrial Radio Access Network
FOrCES Forwarding and Control Element Separation protocol
GGSN Gateway GPRS Support Node
GPRS General Packet Radio Service
GTP GPRS Tunnel Protocol
HeNB Home evolved Node B
LGW Local Gateway
LTE Long Term Evolution
MME Mobility management Entity
PGW packet gateway
PIP physical infrastructure provider
PLMN Public Land Mobile Network
PMM Packet Mobility Management
RAN, RAT radio access network, radio access technology
SGSN Serving GPRS Support Node
SGW Serving gateway
SGW-C serving gateway-control plane
SGW-U serving gateway-user plane
SDN Software defined networks
UE User Equipment
VNO virtual network operator
VNP virtual network provider

What is claimed is:

1. A method for a user plane idle mode buffering within a software defined network architecture in which a control plane is separated from the user plane, comprising:
   indicating from the control plane to the user plane that a user plane idle state is active;
   allocating a buffer for a user plane idle procedure in a user plane node, wherein the user plane node is at least one of a Serving Gateway user plane, a Serving General Packet Radio Service Support Node user plane, a Home base station Gateway user plane and a Local Gateway user plane; and
   notifying, from the user plane to the control plane, a communications protocol controller about received packets at the user plane node, wherein
   a communications protocol is an interface between a control layer and a forwarding layer of the software defined network architecture,
   the indication that the user plane idle state is active, a first instruction for allocating the buffer, and a second instruction to the user plane for the notification about received packets, are included in a message which is composed by the communications protocol controller and is transmitted to the user plane node, and
   only a first received packet is to be indicated to the communications protocol controller while any subsequent received packet is appended to the allocated buffer.

2. The method according to claim 1, wherein the user plane idle state is a Evolved Packet System Connection Management idle state, wherein the buffer is allocated for an Evolved Packet System Connection Management idle procedure, or a Packet Mobility Management idle state, wherein the buffer is allocated for a Packet Mobility Management idle process.

3. The method according to claim 2, wherein, in case of an Evolved Packet System Connection Management idle state, the indication that an Evolved Packet System Connection Management idle state is active is an ECM IDLE information element, and, in case of a Packet Mobility Management idle state, the indication that a Packet Mobility Management idle state is active is an PMM IDLE information element.

4. The method according to claim 3, wherein the communications protocol is a protocol in an Open Flow or Forces or H.248 environment, and
   wherein the ECM IDLE active Information Element or PMM IDLE active information element is included in a Modification Flow or another message in an OpenFlow protocol environment.

5. The method according to claim 1, further comprising detaching a General Packet Radio Service tunnel protocol tunnel between a base station and the user plane node from a General Packet Radio Service tunnel protocol tunnel between the serving gateway user plane and a packet gateway user plane, while keeping the General Packet Radio Service tunnel protocol tunnel between the serving gateway user plane and the packet gateway user plane.

6. The method according to claim 1, wherein, after successful establishment of bearers between the base station and the serving gateway or the Serving General Packet Radio Service Support Node, requesting the serving gateway or the Serving General Packet Radio Service Support Node to send all received downlink packets.

7. The method according to claim 1, wherein the communications protocol controller is integrated with the serving gateway control plane or the Serving General Packet Radio Service Support Node control plane or physically or logically separated from the serving gateway control plane or the Serving General Packet Radio Service Support Node control plane.

8. An apparatus for a user plane idle mode buffering within a software defined network architecture in which a control plane is separated from the user plane, comprising:
   at least one processor, and
   at least one memory for storing instructions to be executed by the at least one processor,
   wherein the at least one memory and the instructions are configured to, with the at least one processor, cause the apparatus at least to perform:
   indicating from the control plane to the user plane that a user plane idle state is active;
   allocating a buffer for a user plane idle procedure in a user plane node, wherein the user plane node is at least one of a Serving Gateway user plane, a Serving General Packet Radio Service Support Node user plane, a Home base station Gateway user plane and a Local Gateway user plane; and notifying, from the user plane to the control plane, a communications protocol controller about received packets at the user plane node, wherein a communications protocol is an interface between a control layer and a forwarding layer of the software defined network architecture, the communications protocol controller is configured to compose a message including the indication that the user plane idle state is active, a first instruction for allocating the buffer, and a second instruction to the user plane for the notification about received packets, and the processor is adapted to cause transmission of the message to the user plane node, and only a first received packet is to be indicated to the communications protocol controller while any subsequent received packet is appended to the allocated buffer.

9. The apparatus according to claim 8, wherein the user plane idle state is a Evolved Packet System Connection Management idle state, wherein the controller is configured to allocate the buffer for an Evolved Packet System Connection Management idle procedure, or a Packet Mobility Management idle state, wherein the controller is configured to allocate the buffer for a Packet Mobility Management idle process.

10. The apparatus according to claim 8, wherein the at least one memory and the instructions are configured to, with the at least one processor, cause the apparatus at least to further perform causing detaching a General Packet Radio Service tunnel protocol tunnel between a base station and a user plane node from a General Packet Radio Service tunnel protocol tunnel between the serving gateway user plane and a packet gateway user plane, while keeping the General Packet Radio Service tunnel protocol tunnel between the serving gateway user plane and the packet gateway user plane.

11. The apparatus according to claim 8, wherein the at least one memory and the instructions are configured to, with the at least one processor, cause the apparatus at least to further perform requesting the serving gateway to send all received packets after successful establishment of bearers between the base station and the serving gateway or the Serving General Packet Radio Service Support Node.

12. The apparatus according to claim 8, wherein, in case of an Evolved Packet System Connection Management idle state, the indication that an Evolved Packet System Connection Management idle state is active is an ECM IDLE information element, and, in case of a Packet Mobility Management idle state, the indication that a Packet Mobility Management idle state is active is an PMM IDLE information element.

13. The apparatus according to claim 12, wherein the communications protocol is a protocol in an Open Flow or Forces or H.248 environment, and wherein the ECM IDLE active Information Element or PMM IDLE active information element is included in a Modification Flow or another message in an OpenFlow protocol environment.

14. The apparatus according to claim 8, wherein the communications protocol controller is integrated with the serving gateway control plane or the Serving General Packet Radio Service Support Node control plane or physically or logically separated from the serving gateway control plane or the Serving General Packet Radio Service Support Node control plane.

15. A computer program product embodied on a non-transitory computer readable medium, comprising program instructions, that when executed by a processor to perform:

indicating from a control plane to a user plane that a user plane idle state is active;

allocating a buffer for a user plane idle procedure in a user plane node, wherein the user plane node is at least one of a Serving Gateway user plane, a Serving General Packet Radio Service Support Node user plane, a Home base station Gateway user plane and a Local Gateway user plane; and notifying, from the user plane to the control plane, a communications protocol controller about received packets at the user plane node, wherein a communications protocol is an interface between a control layer and forwarding layer of a software defined network architecture, the indication that the user plane idle state is active, a first instruction for allocating the buffer, and a second instruction to the user plane for the notification about received packets, are included in a message which is composed by the communications protocol controller and is transmitted to the user plane node, and only a first received packet is to be indicated to the communications protocol controller while any subsequent received packet is appended to the allocated buffer.

* * * * *